United States Patent
Cheng et al.

(10) Patent No.: US 11,641,598 B2
(45) Date of Patent: May 2, 2023

(54) DEVICE-TO-DEVICE QUALITY OF SERVICE FLOW MANAGEMENT

(71) Applicant: QUALCOMM Incorporated, San Diego, CA (US)

(72) Inventors: Hong Cheng, Basking Ridge, NJ (US); Zhibin Wu, Los Altos, CA (US); Sudhir Kumar Baghel, Hillsborough, NJ (US); Kapil Gulati, Hillsborough, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/870,529

(22) Filed: May 8, 2020

(65) Prior Publication Data

US 2020/0396636 A1    Dec. 17, 2020

Related U.S. Application Data

(60) Provisional application No. 62/861,207, filed on Jun. 13, 2019.

(51) Int. Cl.
*H04W 28/02*    (2009.01)
*H04W 28/24*    (2009.01)
(Continued)

(52) U.S. Cl.
CPC ......... *H04W 28/0268* (2013.01); *H04W 4/44* (2018.02); *H04W 8/04* (2013.01);
(Continued)

(58) Field of Classification Search
None
See application file for complete search history.

(56) References Cited

U.S. PATENT DOCUMENTS

2020/0008266 A1* 1/2020 Pan ..................... H04W 28/06
2020/0236600 A1* 7/2020 Hong ................ H04W 72/0453
(Continued)

FOREIGN PATENT DOCUMENTS

| CN | 201910245337 | * | 10/2020 | ............ H04W 72/04 |
| KR | 1020190051783 | * | 5/2020 | ............. H04W 4/40 |
| KR | 1020190049316 | * | 11/2020 | ............. H04W 4/40 |
| WO | WO 2020/015727 | * | 7/2020 | ............ H04W 40/02 |

OTHER PUBLICATIONS

Wim Vandenberghe, Erwin Van de Velde, Chris Blondia, Ingrid Moerman and Piet Demeester, Vehicular ad hoc networking based on the incorporation of geographical information in the IPv6 header, pp. 1-25 (Year: 2012).*

(Continued)

*Primary Examiner* — Christopher M Crutchfield
(74) *Attorney, Agent, or Firm* — Procopio, Cory, Hargreaves & Savitch LLP

(57) ABSTRACT

A method, a computer-readable medium, and an apparatus are provided for wireless communication. The apparatus receives data traffic from an application layer and assigns at least one Quality of Service (QoS) flow identifier (ID) for the data traffic based on radio resources information for the data traffic. The data packets for transmission with different radio resources are assigned different QoS flow IDs.

40 Claims, 9 Drawing Sheets

(51) Int. Cl.
*H04W 4/44* (2018.01)
*H04W 8/04* (2009.01)
*H04W 76/14* (2018.01)
*H04W 92/18* (2009.01)
*H04L 101/686* (2022.01)

(52) U.S. Cl.
CPC ........... *H04W 28/24* (2013.01); *H04W 76/14* (2018.02); *H04W 92/18* (2013.01); *H04L 2101/686* (2022.05)

(56) References Cited

U.S. PATENT DOCUMENTS

| | | | |
|---|---|---|---|
| 2020/0275425 A1* | 8/2020 | Cao | H04W 4/44 |
| 2020/0344636 A1* | 10/2020 | Lee | H04W 80/02 |
| 2020/0344637 A1* | 10/2020 | Kim | H04W 28/0268 |
| 2020/0413279 A1* | 12/2020 | Kim | H04W 76/27 |
| 2021/0195558 A1* | 6/2021 | Tang | H04W 72/082 |
| 2022/0015107 A1 | 1/2022 | Li et al. | |
| 2022/0060934 A1* | 2/2022 | Ying | H04W 28/0875 |
| 2022/0141702 A1* | 5/2022 | Ali | H04W 28/0268 370/229 |

OTHER PUBLICATIONS

Author Unknown, Left issue on QoS mapping for NR-V2X, pp. 1-4, May 17, 2019.*

Apple Inc: "QoS Handling in NR V2X", 3GPP TSG-RAN WG2 Meeting #104, R2-1817468, 3rd Generation Partnership Project (3GPP), Mobile Competence Centre; 650, Route Des Lucioles; F-06921 Sophia-Antipolis Cedex; France, vol. RAN WG2, No. Spokane, USA; Nov. 12, 2018-Nov. 16, 2018, (Nov. 12, 2018), 4 pgs, XP051556995, From Internet: URL: http://www.3gpp.org/ftp/Meetings%5F3GPP%5FSYNC/RAN2/Docs/R2%2D1817468%2Ezip [retrieved on Nov. 12, 2018], 2.1 QoS Scheme in LTE V2X, 2.2 QoS Handling in NR V2X over Uu Interface.

Huawei., et al., "QoS Management for NR V2X", 3GPP TSG RAN WG1 Meeting #95; R1-1812214, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, (Nov. 11, 2018), 4 pgs, XP051554086, From Internet: URL: http://www.3gpp.org/ftp/Meetings%5F3GPP%5FSYNC/RAN1/Docs/R1%2D1812214%2Ezip [retrieved on Nov. 11, 2018] 2 Discussion, 2.1 QoS framework for Advanced V2X over Uu and PC5 Interface.

International Search Report and Written Opinion—PCT/US2020/032375—ISA/EPO—dated Jul. 17, 2020.

* cited by examiner

DEVICE-TO-DEVICE QUALITY OF SERVICE FLOW MANAGEMENT

CROSS REFERENCE TO RELATED APPLICATION

This application claims the benefit of U.S. Provisional Application Ser. No. 62/861,207, entitled "Device-to-Device Quality of Service Flow Management" and filed on Jun. 13, 2019, which is expressly incorporated by reference herein in its entirety.

BACKGROUND

Technical Field

The present disclosure relates generally to communication systems, and more particularly, to wireless communication including quality of service (QoS) flow management.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in vehicle-to-everything (V2X) and/or other device-to-device (D2D) communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The apparatus receives data traffic from an application layer and assigns at least one QoS flow identifier (ID) for the data traffic based on radio resources information for the data traffic. The data packets for transmission with different radio resources are assigned different QoS flow IDs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
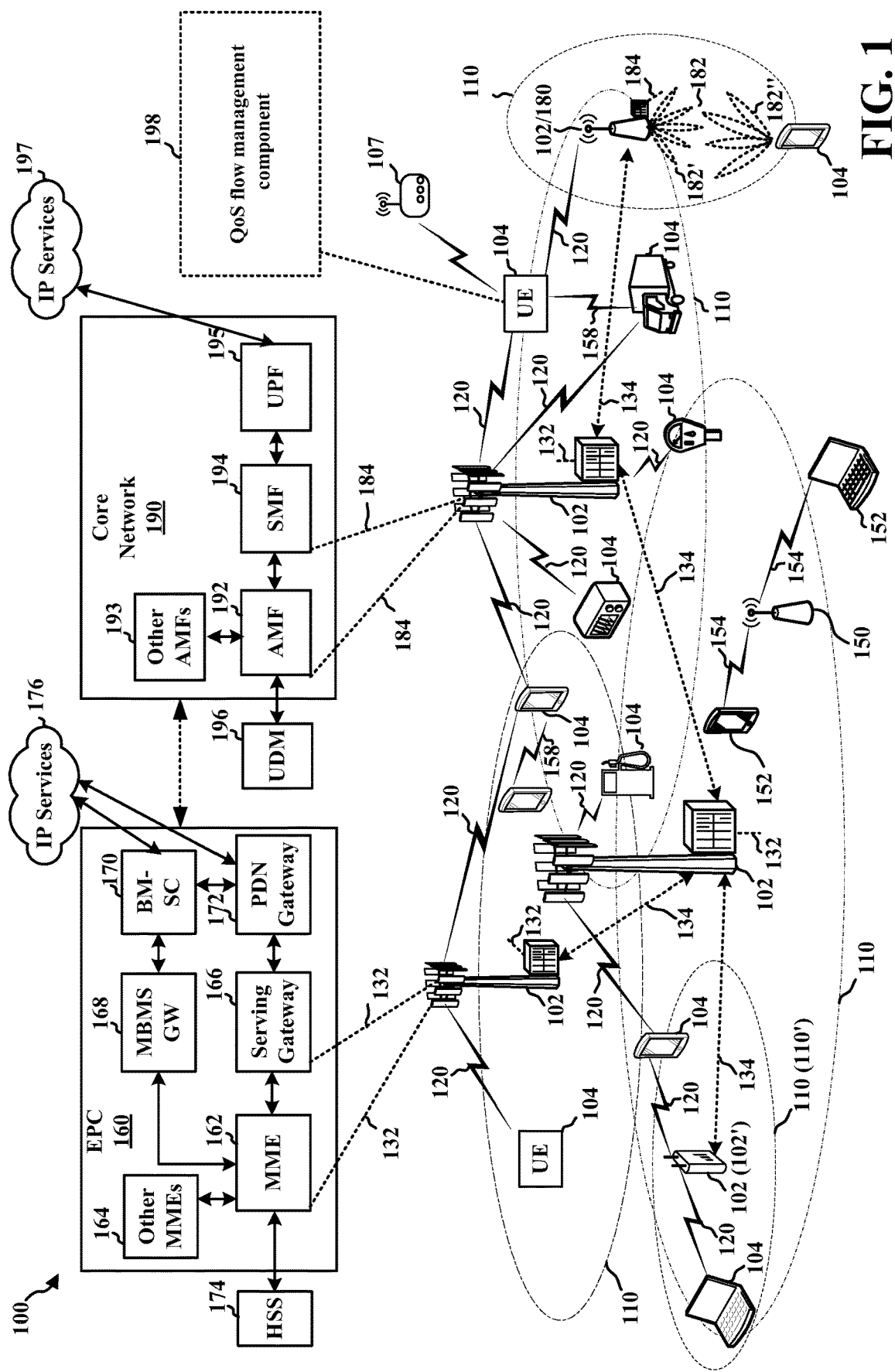
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. In some aspects, a UE 104 in the communication system may comprise a QoS Flow management component 198 configured to assign at least one QoS flow ID for the data traffic using at least one of radio resources information and/or traffic type information for the data traffic, wherein data packets for transmission with different radio resources are assigned different QoS flow IDs. The QoS flow management component 198 may assign the QoS flow ID(s) further based on additional considerations, as described herein. Similar to the illustration for UE 104, an RSU 107 or other device communicating based on D2D/V2D/PC5 etc., may comprise a similar QoS Flow management component 198.

Some wireless communication networks may include vehicle-based communication devices that can communicate based on vehicle-to-vehicle (V2V), vehicle-to-infrastructure (V2I) (e.g., from the vehicle-based communication device to road infrastructure nodes such as a Road Side Unit (RSU)), vehicle-to-pedestrian (V2P), vehicle-to-network (V2N) (e.g., from the vehicle-based communication device to one or more network nodes, such as a base station), cellular vehicle-to-everything (CV2X), enhanced vehicle-to-everything (eV2X), etc., which can be collectively referred to herein as vehicle-to-everything (V2X) communication. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or other D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the oncepts described herein may be applicable to other similar areas, such as LTE, LTE-A, CDMA, GSM, and other wireless technologies.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
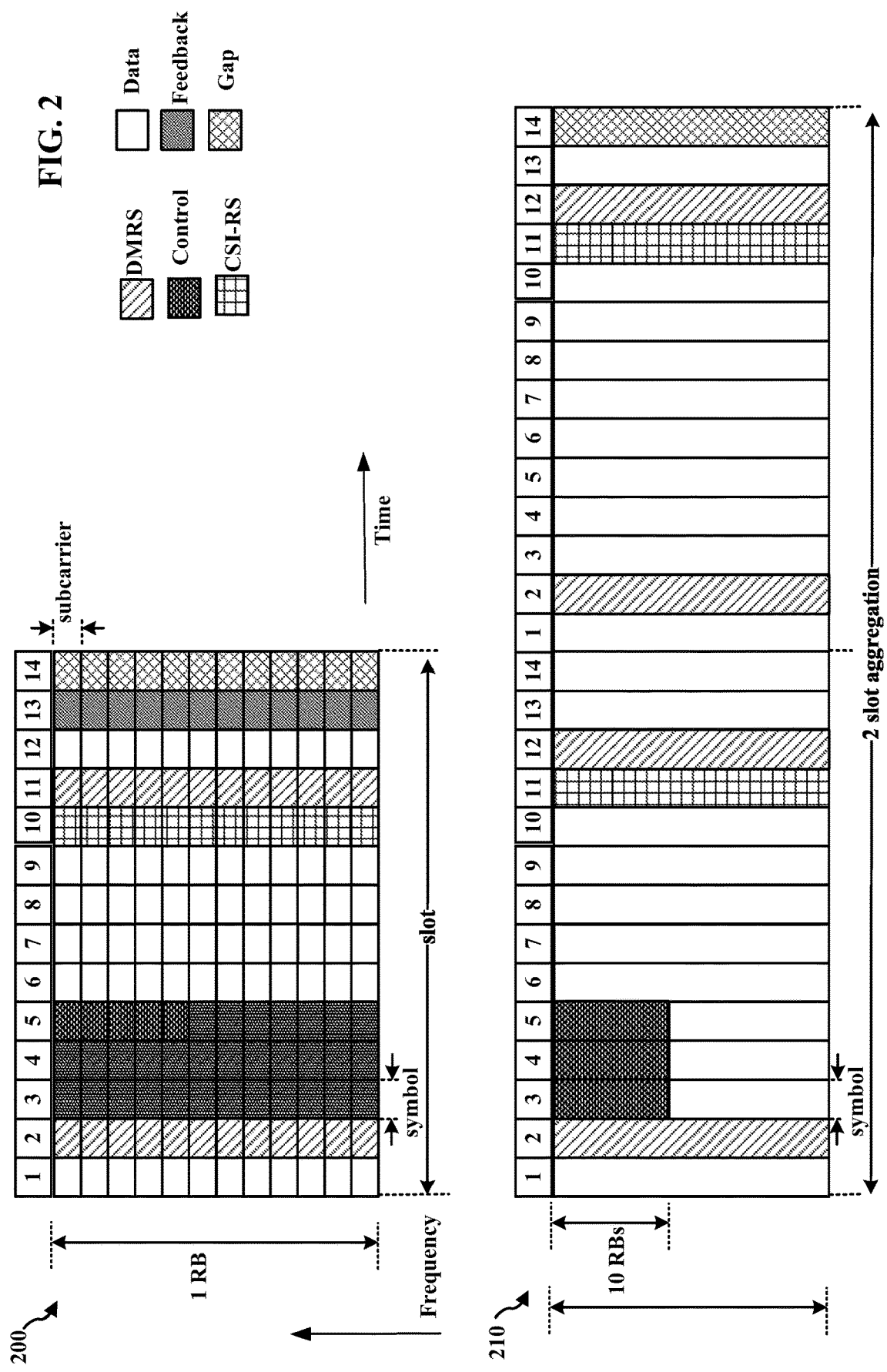
FIG. 2 illustrates an example of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
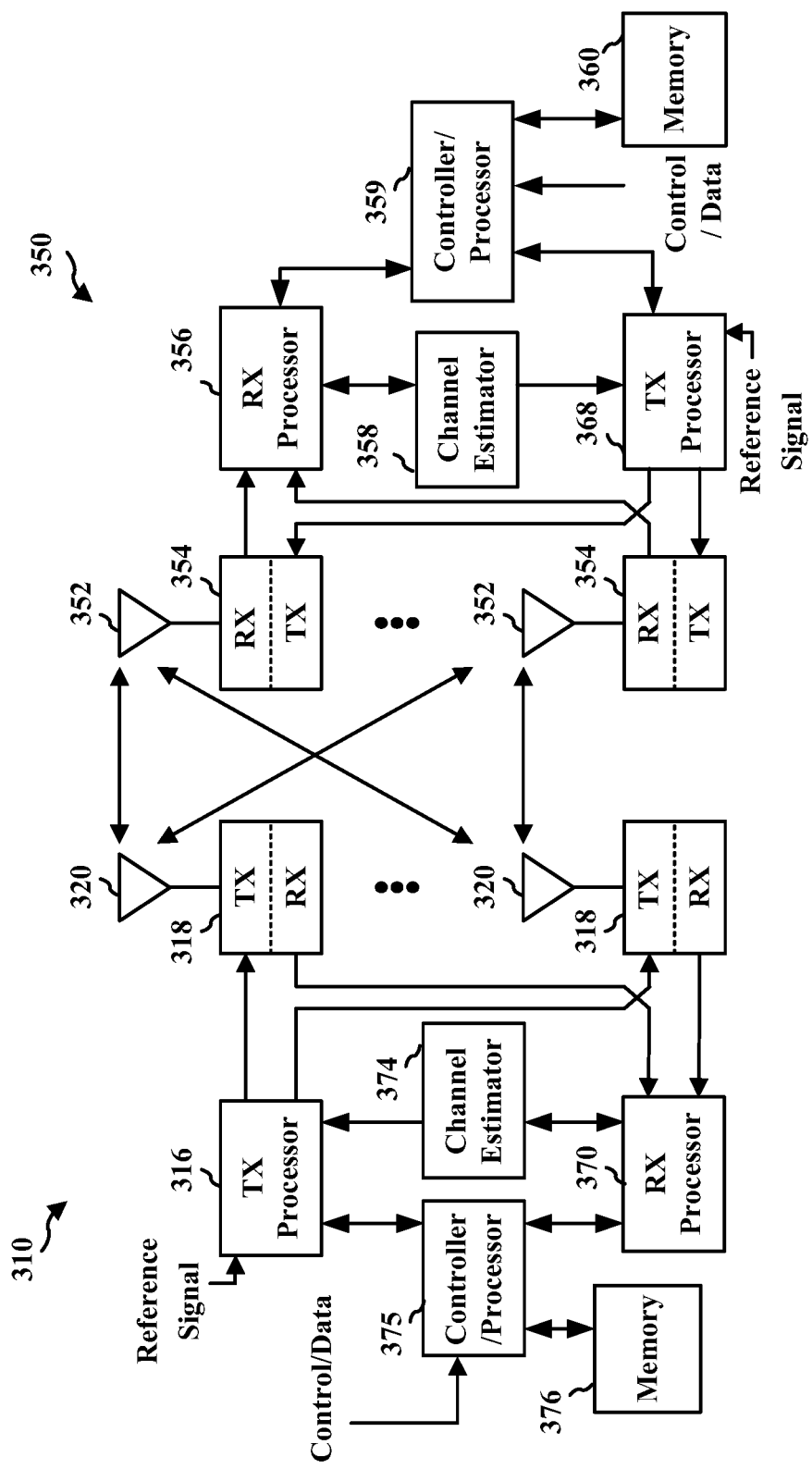
FIG. 3 is a diagram illustrating an example of a first device and a second device involved in wireless communication based, e.g., on V2V, V2X, and/or other device-to-device communication.

FIG. 3 is a block diagram 300 of a first wireless communication device 310 in communication with a second wireless communication device 350, e.g., via V2X or other D2D communication. The device 310 may comprise a transmitting device communicating with a receiving device, e.g., device 350, via V2X or other D2D communication. The communication may be based, e.g., on sidelink. The device 310 may comprise a UE, an RSU, etc. The device 350 may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 of FIG. 1.

Figure 4:
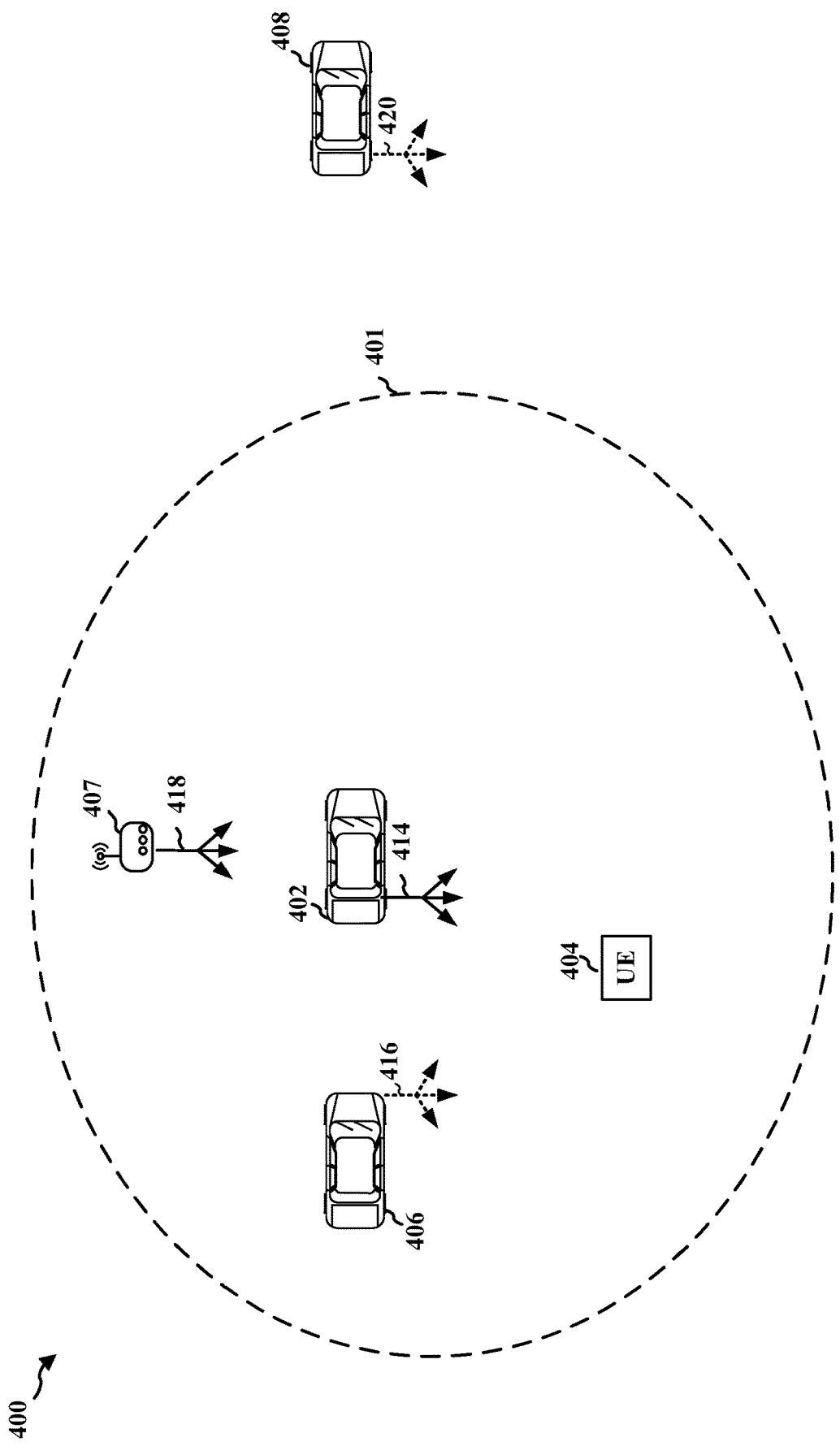
FIG. 4 illustrates an example of V2X and/or other device-to-device communication.

FIG. 4 illustrates an example 400 of wireless communication between devices based on V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting a transmissions 416, 420. The transmissions 414, 416, 418, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a QoS flow management component, similar to 198 described in connection with FIG. 1.

Figure 5:
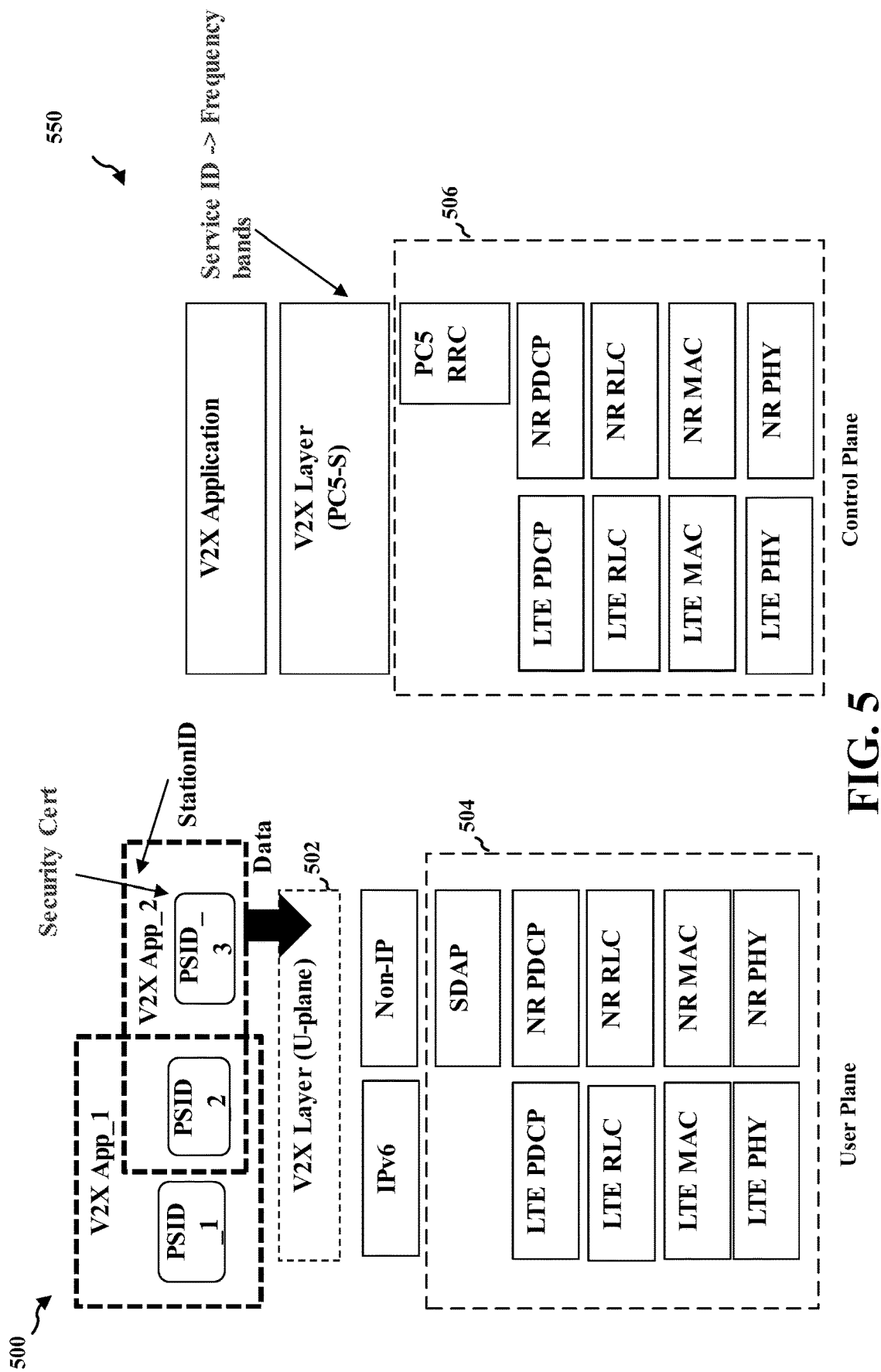
FIG. 5 illustrates example protocol stacks for wireless communication including V2X communication.

A V2X QoS flow management model (e.g., for enhanced V2X (eV2X)) may support different QoS flow IDs for different services. Services may be identified by a service type ID such as a provider service ID (PSID) or an intelligent transportation system application identifier (ITS-AID). FIG. 5 illustrates an example 500 showing data traffic processed by a user plane protocol stack for two different applications V2X App_1 and V2X App_2. V2X App_1 may generate communication associated with a first service type ID, e.g., PSID_1, and a second service type ID, e.g., PSID_2. V2X App_2 may generate communication associated with the second service type ID, e.g., PSID_2, and a third service type ID, e.g., PSID_3. FIG. 5 also illustrates an example control plane protocol stack 550. The control plane protocol stack generates control signaling messages, e.g. PC5 Signaling message, or PC5 RRC messages, to manage the link between UEs for unicast type of communication.

Communication associated with PSID_1, PSID_2, and PSID_3 may be separated into different QoS flows. A per flow QoS management may be applied to broadcast communication, groupcast communication, and/or unicast communication. For example, communication generated by each of the services types may be assigned a separate QoS flow ID. As illustrated in FIG. 5, data traffic from an application layer, e.g., V2X App_1 or V2X App_2, may be processed by a V2X layer based on QoS rules to be separated into different QoS flows. Each QoS flow may have a different PC5 QoS flow ID (PFI) and corresponding QoS parameters. The QoS parameters associated with a PFI may include any of a PC5 5QI (PQI), a range, bit rates, etc. Thus, the PFI could be different than the PQI, which may be one parameter associated with an assigned PFI. A QoS flow configuration may be configured by V2X layer 502 to the AS layer 504 (e.g., to RRC, MAC, and/or physical layer(s)) prior to processing data traffic from the application layer. An access stratum (AS) layer may comprise a PDCP layer, an RLC layer, a MAC layer, and a PHY layer, as illustrated in example, 500. FIG. 5 illustrates a AS layer protocol stack for LTE and another protocol stack for NR. The protocol stack for NR is illustrated with an additional Service Data Adaptation Protocol (SDAP) layer. In the control plane example 550, the AS layer 506 may comprise an additional PC5 RRC layer for NR communication. The AS layer may determine a mapping of the QoS flows to a radio bearer, e.g., to a PC5 radio bearer. For example, the SDAP may determine the mapping for the QoS flows. The radio bearer mapping may be performed based on the PFI by the SDAP layer. The radio bearer mapping may be determined by the UE, e.g. the PC5 RRC layer, and informed to the SDAP layer. The radio bearer mapping may be configured, e.g., for a broadcast or groupcast. The radio bearer may be negotiated between UEs, e.g., for a unicast or groupcast.

For unicast communication, different services may be supported over the same layer 2 link between two UEs. As well, communication associated with different services, e.g., with a different PSID/ITS-AID, may be allocated with different frequencies. For example, regulators may assign dedicated frequency resources for certain services. As an example, 20 MHz may be assigned for safety services, 30 MHz or 30+20 MHz or Frequency Range 2 (FR2) may be assigned for advanced services, etc. A V2X UE may be configured with frequency band allocation information, e.g., at the V2X layer 502. The UE may be preconfigured with such information or may be provisioned with the information from the network, e.g. via OMA-DM from the V2X Control Function, or via control plane signaling (NAS signaling) from the PCF. The frequency band allocation information may specify the frequency band(s) that a particular PSID is allowed to use, for example. At times, there may be a conflict between configurations using different frequency resources for different services and a configuration that supports the transmission of different services over a same layer 2 link, e.g., when a QoS flow comprises multiple services. If the services contained in the QoS flow are associated with different frequency resources, there may be a problem mapping the QoS flow to radio resources, especially if the QoS rules for filtering data traffic into QoS flows is based on QoS requirements without considering frequency band information. Multiple services (with different PSIDs/ITS-AIDs) may be placed in the same QoS flow based on similar QoS requirements for the services. For example, a PFI may be set to be equal to PQI, i.e. all packets sharing the same PQI is placed into the same QoS flow. This could lead to multiple services being grouped into a same QoS flow without differentiation for the different services. Thus, the different services would be mapped to the same radio bearer. Furthermore, PC5 communication, e.g., NR PC5 communication, may be limited to supporting a single frequency carrier depending on configuration. In that case, the different services in the same radio bearer will be sent over the same frequency band, which may conflict with the specific frequency bands assigned for different services.

Aspects presented herein enable QoS flow management that applies QoS rules based on additional information and parameters. A filter applied at the V2X layer for QoS flow management of data traffic from the application layer may assign PFI(s) based on PQI, range, and any combination of frequency band information, data type, communication mode, destination ID, service ID, IP packet filters, or QoS requirements from the application layer. PC5 QoS flow parameters may comprise a guaranteed bit rate (GBR), a guaranteed flow bit rate (GFBR), a maximum flow bit rate (MFBR), and/or a PC5 link aggregated maximum bit rate (PC5 link AMBR).

For example, a different PFI may be assigned based on frequency band information, e.g., if provided for data traffic associated with a particular frequency band. Thus, data traffic associated with different frequency bands may be assigned different PFIs. A different PFI may be assigned based on data type, e.g., whether the data traffic is IP data traffic or non-IP data traffic. A PFI may be assigned based on a communication mode, e.g., whether the data traffic is broadcast data traffic, groupcast data traffic, or unicast data traffic. A PFI may be assigned based on a service type ID, e.g., based on a PSID or an ITS-AID. Thus, data traffic for different service types may be assigned different PFIs. A PFI may be assigned based on destination for the data traffic. For example, a destination ID for broadcast traffic may comprise a broadcast L2 ID. A destination ID for groupcast traffic may comprise a group ID or a translated groupcast L2 ID. A destination ID for unicast data traffic may comprise a target UE application layer ID, a Link ID, or a translated unicast L2 ID. A PFI may be assigned based on QoS requirements received at the V2X layer from the application layer. As an example, the QoS requirements may comprise any of a packet delay budget (PDB) for the data traffic, packet error rate (PER) for the data traffic, a range for the data traffic, etc. A PFI may be assigned based on IP packet filter information, e.g., if provided for the data traffic. The V2X layer may use any of the example parameters/information for the data traffic to determine whether to group the data traffic into an existing QoS flow or to assign a new PFI.

At least some of the information used to determine the PFI may be passed from the V2X layer to the AS layer. The information may be used at the AS layer to determine whether data traffic for different PFIs can be combined when mapping to radio bearer(s). As an example, the data type information for the data traffic may be passed from the V2X layer to the AS layer along with the assigned PFI. The AS layer may use the data type information so that the AS layer does not combine IP data traffic and non-IP data traffic into the same radio bearer(s). As another example, the frequency information may be passed to the AS layer, where it can be used in mapping QoS flows to the radio bearer(s). The AS layer may use the frequency information to avoid combining data traffic associated with different frequency bands when mapping the data traffic to radio bearer(s). The AS layer may also use the frequency information for the data traffic to map the QoS flow to the correct dedicated radio bearer (DRB), e.g., to a PC5 radio bearer that does not have a conflict with the data traffic comprised in the QoS.

Thus, based on the new QoS flow management aspects presented here, the V2X layer may filter data traffic from the application layer based on frequencies associated with the related applications and/or a data type so that services with conflicting frequencies and/or data types can be allocated to different QoS flows.

Figure 6:
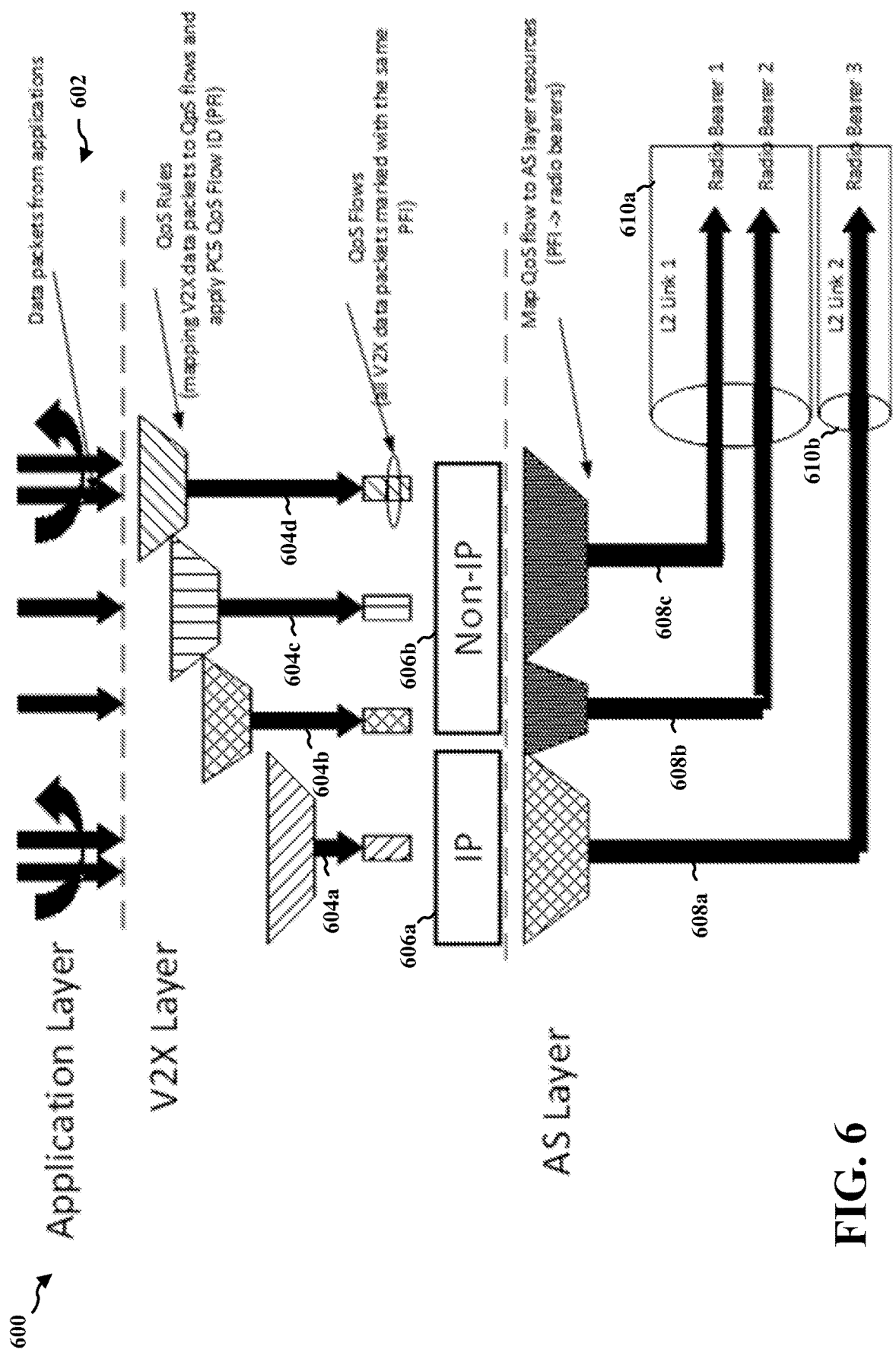
FIG. 6 illustrates an example of QoS flow management for V2X communication.

FIG. 6 illustrates a diagram 600 of an example of filtering data traffic from an application layer and mapping to radio bearers. As illustrated, multiple data packets 602 may be received at the V2X layer from an application layer, e.g., from various applications of a UE. The V2X layer may filter the data traffic and assign PFIs to the filtered data traffic. For example, FIG. 6 illustrates the data traffic being filtered into/assigned four different PFIs 604a, 604b, 604c, 604d. Each of PFIs 604a, 604b, 604c, 604d has a different PFI ID.

Thus, the data traffic including multiple data packets 602 from the application layer would be separated into QoS flows comprising V2X data packets marked with the same PFI. The V2X layer may incorporate frequency band mapping into the QoS rules generation/negotiation. Thus, services with different frequency bands can be given different QoS flow IDs. Additionally or alternatively, the QoS rules may be based on a data type, a communication mode, a destination ID, a service ID, IP packet filter(s), or QoS requirements from the application layer. As illustrated at 606a, 606b, the data packets may be filtered for/remain separated according to the type of data. Thus, IP data and non-IP data may be assigned to different PFIs. The communication type information may be passed to the AS layer. The AS layer may map the QoS flows to AS layer resources. As part of the mapping, the AS layer may map the data traffic to radio bearers based on the PFI(s). The AS layer may combine data traffic as part of the mapping. For example, FIG. 6 illustrates that data traffic for PFI 604c and 604d are combined by the AS layer into QoS flow 608c. Data traffic marked with PFI 604b is illustrated as being mapped separately as QoS flow 6081b. Similarly, PFI 604a is illustrated as being mapped separately as QoS flow 608a. While QoS flows 608b and 608c are mapped to separate radio bearers, the AS layer is illustrated as mapping the two QoS flows to a shared L2 link 610a. The different radio bearers in L2 link 1 (610a) may comprise different frequency bands from each other. QoS flow 608a is mapped to a separate radio bearer and a separate L2 link 2 (610b). As an example, the AS layer may map IP data traffic to a separate L2 link than non-IP data traffic. As well, the AS layer may determine to map data traffic for different QoS flows to different radio bearers within a shared L2 link based on whether an assigned frequency band for the QoS flows will allow for the same L2 link. The AS layer, e.g., SDAP or RRC layer may determine a mapping between a QoS flow and a radio bearer. The frequency band information may be added to QoS flow parameters so that the AS layer will determine the mapping accordingly. As an example, the AS layer may determine whether there are overlapping bands associated with the QoS flows, and may map the QoS flows to a shared radio bearer or a shared link when there are overlapping frequency bands. When the AS determines the QoS flow information for a QoS flow associated with a PFI, the AS may determine if multiple QoS flows can be merged into the same radio bearer based on frequency band information for the QoS flow.

As an example for a broadcast or connection-less groupcast transmission, a V2X layer may apply preconfigured QoS rules to filter data traffic from the application layer for transmission, e.g., from a UE. If there is a service type to QoS mapping, different QoS rules may be generated for each QoS level. A service type may be based on a PSID/ITS-AID. A first example QoS rule may be:

[PFI=1][Filter: PSID_1, PSID_2]+[QoS parameters: PQI=1]

Thus, PFI of 1 would be applied to data traffic for services PSID_1 and PSID 2 that has a PQI of 1. Data traffic for a different PSID and/or different PQI may have a PFI assigned according to a different rule.

The rule may further be based on a range, e.g.,

[PFI=1][Filter: PSID_1, PSID_2]+[QoS parameters: PQI=1, Range=100 m]

In this example, a PFI of 1 may be applied to the data traffic for services PSID_1 and SID 2 that has a PQI of 1 and an intended range of reception of 100 m.

The V2X layer may determine whether the service type (e.g., PSID_1 and/or PSID_2 has a frequency mapping, e.g., an assigned radio bearer. As an example, if PSID_1 and PSID_2 have different frequency bands, the QoS rule may be split into the following example QoS rules:

[PFI=11][Filter: PSID_1]+[QoS parameters: PQI=1, Range=100 m, Frequency band 1]

[PFI=12][Filter: PSID_2]+[QoS parameters: PQI=1, Range=100 m, Frequency band 2]

The QoS rules may also be applied without the range parameter. The Application layer may use APIs to request specific QoS level(s) for a particular service type, e.g. to request an increased priority for a particular PSID. In this example, the V2X layer may determine if the QoS Rule is to be updated, or if a new QoS rule is to be generated.

At the AS layer, each QoS flow may be given a different virtual radio bearer, e.g., there may be different queues if there are different frequency bands.

As an example for managed groupcast V2X communication, there may be QoS rules created based on the group(s) with which the UE communicates. A set of QoS rules may be generated for each group based on application layer requirement(s) of the related service types. For example, the application layer may call an API to provide to the V2X layer any of a group ID, a service type (e.g., PSID/ITS-AID), or associated QoS requirements for each service type. If no QoS requirements are provided, the UE may use a preconfigured QoS level for the PSID/ITS-AID or a default QoS level for unknown PSID(s)/ITS-AID(s). An example QoS rule may be:

[PFI=1][Filter: Group ID_1; PSID_1, PSID_2]+[QoS parameters: PQI=1].

Thus, a first PFI may be applied to data traffic at the V2X layer that is associated with Group ID "Group ID_1" for services PSID_1 and PSID_2 and having a PQI of 1. Data traffic for other groups (i.e., having a different Group ID), from other services, or having a different QoS parameter may have a different PFI applied at the V2X layer. The Group ID may comprise a mapped L2 ID that is made known to the application that generates the data traffic. After considering the group ID, the V2X layer may then check the service ID to determine whether there is a frequency mapping to a particular frequency, e.g., a dedicated radio bearer. If there are different frequency bands, multiple PFI rules may be applied. As an example,

[PFI=11][Filter: Group ID_1; PSID_1]+[QoS parameters: PQI=1, Frequency band 1];

and

[PFI=12][Filter: Group ID_1; PSID_1]+[QoS parameters: PQI=1, Frequency band 2].

Thus, data traffic intended for the group of UEs identified by Group ID_1 for service PSID_1 and having QoS parameter PQI=1, a PFI 11 may be applied to data traffic for frequency band 1, and PFI 12 may be applied to data traffic for frequency band 2. The AS layer may map this QoS flow to two different radio bearers, as the frequency bands are different, i.e., frequency band 1 and frequency band 2.

As another example, unicast signaling may involve signaling between two UEs. The unicast communication may comprise managed unicast communication. The unicast communication may use a PC5_S protocol for negotiating QoS flow information. The V2X layer may make determinations regarding the QoS flow and QoS rules before the signaling, e.g., before transmitting data traffic. The QoS flow information may be passed down from the V2X layer after confirmation of a link set up by the peer UE that will receive the data traffic.

For unicast, a link ID may be generated when a layer 2 link is determined to be established with the target UE. This Link ID may be local and may stay constant during the lifetime of the unicast link (whereas the L2 IDs may change). The Link ID may be passed back to the application. Then, the application may use this Link ID when passing the data packets down to V2X layer. The QoS rule filter may use the link ID as a parameter for filtering data traffic at the V2X layer. The link ID may be applied as one of the filter fields when determining the QoS Flow such that packets to different Link IDs are separated in to different QoS flows. Additionally, the AS might not merge QoS flows of different Link IDs into the same radio bearer. Thus, the link ID information may be passed to the AS layer. Thus, the Link ID may be also included as part of the QoS flow parameters. The following is an example QoS rule including Link ID:

[PFI=1][Filter: Link ID 1; PSID_1]+[QoS parameters: PQI=1, Frequency band 1, Link ID 11].

Thus, a particular PFI (e.g. 1) may be applied for unicast data traffic associated with Link ID 1 for service PSID_1 and PQI=1. As described for broadcast and groupcast communication, the rule may optionally be further based on frequency band so that a different PFI rule is applied for Link ID 1 for service PSID_1 and PQI=1 and a first frequency band than for Link ID 1 for service PSID_1 and PQI=1 and frequency band 2.

With the same Link ID (i.e. between the same pair of UEs), there could be multiple QoS flows that mapped to the different frequency bands, as long as the QoS flows in the same radio bearers are using the same frequency bands.

The AS layer (e.g. RRC, or SDAP) may determine the QoS flow to radio bearer mapping taking both Link ID, and frequency into consideration.

If the Application Layer does not use the Link ID, it may still indicate the target UE Application Layer ID (e.g. a Station ID or "StationID") when passing the packet down to the V2X layer. In this example, the filter, or QoS rule applied at the V2X layer, may be based on an Application Layer ID. The V2X layer may convert the Application Layer ID into a link ID, or 12 ID when passing the QoS Flow info down to the AS layer. An example QoS rule may include:

[QFI=1][Filter: Application Layer ID; PSID_1]+
[QoS parameters: PQI=1, Frequency band 1,
Link ID 1/L2 ID].

For IP traffic, the Service Type info (PSID/ITS-AID) might not be known to the V2X layer. The application layer may use IP sockets to deliver the packets down to V2X layer. In this example, several potential filtering rules may be used to identify the frequency bands information.

As a first example, the application Layer may set the service type information in the flow label of the IPv6 header (or by extending that with a TC field) for the data traffic. As a flow label field may comprise 20 bits, (with TC field, 28 bits), the number of bits may represent a certain range of service types.

As a second example, the application layer may directly indicate the frequency band information to the V2X layer. In order to enable the application layer to indicate the frequency band information, the V2X layer may expose the frequency band mapping configuration to Application layer.

As a third example, the application layer may use an IPv6 extension header to identify the Service Type. The PC5 QoS Rule may be able to read such extension header.

As a fourth example, a source IP prefix may be used to indicate the service type to the V2X layer. The V2X layer may replace the source IP prefix with the actual IP prefix (e.g. link local IP prefix) before passing such information down to a lower layer. This example may involve IP socket support, e.g., the application layer may indicate the source address when creating the IP socket, e.g. by calling the bind function to perform a binding of the IP prefix with the data traffic.

In another example, each service ID may map to an individual QoS flows or QoS rules. In this example, each QoS flow would service one service ID (e.g., PSID/ITS-AID). Thus, a rule may be indicated, e.g., as PFI !=PQI. A larger PFI number space may be used to accommodate the larger number of QoS flows. In this example, the AS layer (e.g. SDAP, or RRC) may determine, based on the frequency band info associated with the QoS flow, whether to merge the QoS Flows into the same radio bearer when mapping QoS flows to radio bearers. For example, if two QoS Flows have the same Frequency band information and the same QoS parameters (e.g. PQI), the two QoS flows can be merged.

Figure 7:
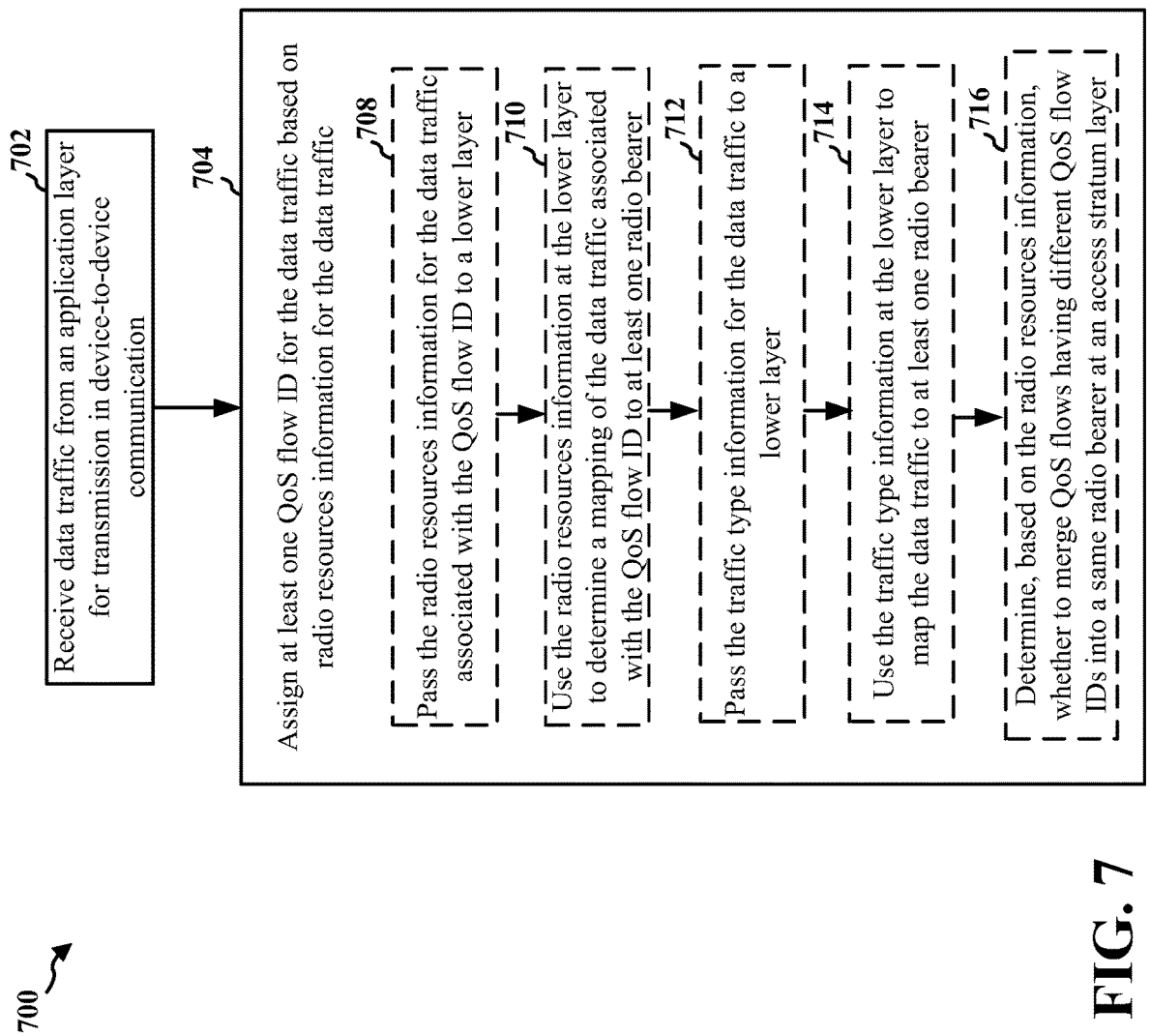
FIG. 7 is a flowchart of a method of wireless communication.

FIG. 7 is a flowchart 700 of a method of wireless communication. The method may be performed by a UE (e.g., the UE 104, the device 350, the apparatus 802/802'; the processing system 914, which may include memory 360, 376 and which may be an entire UE or a component of a UE, such as TX processor 316, the RX processor 370, and/or the controller/processor 375 or TX processor 368, the RX processor 356, and/or the controller/processor 359). Optional aspects are illustrated with a dashed line. The method may enable a UE to more effectively perform QoS flow management.

At 702, the UE receives data traffic from an application layer for transmission in device-to-device communication, such as V2X communication. For example, 702 may be performed by data component 805 from FIG. 8. FIGS. 5 and 6 illustrate examples of data traffic from the application layer that may be received at a V2X layer of a UE.

At 704, the UE assigns at least one Quality of Service (QoS) flow identifier (ID) for the data traffic based on radio resources information for the data traffic. The QoS flow identifier may be assigned based on both radio resources information and traffic type information. Data packets for transmission with different radio resources are assigned different QoS flow IDs. The device-to-device communication comprises V2X communication and the at least one QoS flow ID may be assigned at a V2X layer based on the radio resources information for the data traffic. For example, 704 may be performed by QoS assignment component 806 from FIG. 8. In one aspect, the radio resources information may comprise a frequency band to be used for the transmission of the data packets, e.g., such as a DRB.

At 708, after assigning the QoS flow ID, the UE may pass the radio resources information for the data traffic associated with the QoS flow ID to a lower layer. At 710, the UE may use the radio resources information at the lower layer to determine a mapping of the data traffic associated with the QoS flow ID to at least one radio bearer. For example, 708 may be performed by radio resources information component 808 from FIGS. 8, and 710 may be performed by radio bearer mapping component 812 from FIG. 8.

In one aspect, the radio resources information may be determined based on a mapping of service type information received from the application layer to the radio resources information. The mapping of service type information to radio resources information may be configured at a user equipment (UE). In certain aspects, the service type information for the data traffic may be indicated from the application layer based on a header for the data traffic. In other aspects, the service type information for the data traffic may be indicated from the application layer based on a header extension for the data traffic, where the header extension comprises one of a flow label or an Internet Protocol (IP) version 6 (IPv6) extension header. In further aspects, the service type information for the data traffic may be indicated from the application layer based on a source identifier. In additional aspects, the radio resources information for the data traffic is indicated from the application layer based on a frequency band indication for the data traffic.

In another aspect, the QoS flow ID may be assigned further based on a communication mode for the data traffic such that the data packets are assigned different QoS flow IDs based on the communication mode. The communication mode comprises one of broadcast communication, groupcast communication, and unicast communication.

In further aspects, the at least one QoS flow ID may be assigned further based on a destination ID for the data traffic such that the data packets with different destination IDs are assigned the different QoS flow IDs. In one aspect regarding the destination ID, the data traffic may be for broadcast communication and the destination ID may comprise a broadcast layer 2 (L2) ID.

In another aspect regarding the destination ID, the data traffic may be for groupcast communication, and the destination ID may comprise a group ID or a translated groupcast layer 2 (L2) ID.

In an additional aspect regarding the destination ID, the data traffic may be for unicast communication, and the destination ID may comprise one of a target UE application layer ID or a link ID.

In another aspect, the at least one QoS flow ID may be assigned further based on one or more QoS requirements from the application layer for the data traffic such that the data packets with different QoS requirements from the application layer are assigned the different QoS flow IDs. The QoS requirements from the application layer may comprise at least one of a packet delay budget (PDB) for the data traffic, a packet error rate (PER) for the data traffic, or a range for the data traffic.

In a further aspect, the at least one QoS flow ID may be assigned further based on a service type ID for the data traffic such that the data packets with different service type IDs are assigned the different QoS flow IDs. The service type ID may comprise a PSID or an ITS-AID.

In some aspects, the at least one QoS flow ID may be assigned based on a one-to-one mapping between the service type ID and the QoS flow ID. Therefore, at 716, the UE may determine, based on the radio resources information, whether to merge QoS flows having different QoS flow IDs into a same radio bearer at an access stratum layer. For example, 716 may be performed by radio bearer merging component 814 from FIG. 8.

The at least one QoS flow ID may be assigned, at 704, further based on traffic type information for the data traffic. For example, at 712, the UE passes the traffic type information for the data traffic to a lower layer, and finally, at 714, the UE uses the traffic type information at the lower layer to map the data traffic to at least one radio bearer. For example, 712 may be performed by traffic type information component 810 from FIGS. 8, and 714 may be performed by radio bearer mapping component 812 from FIG. 8. Internet Protocol (IP) data packets and non-IP data packets are assigned different QoS flow IDs.

Figure 8:
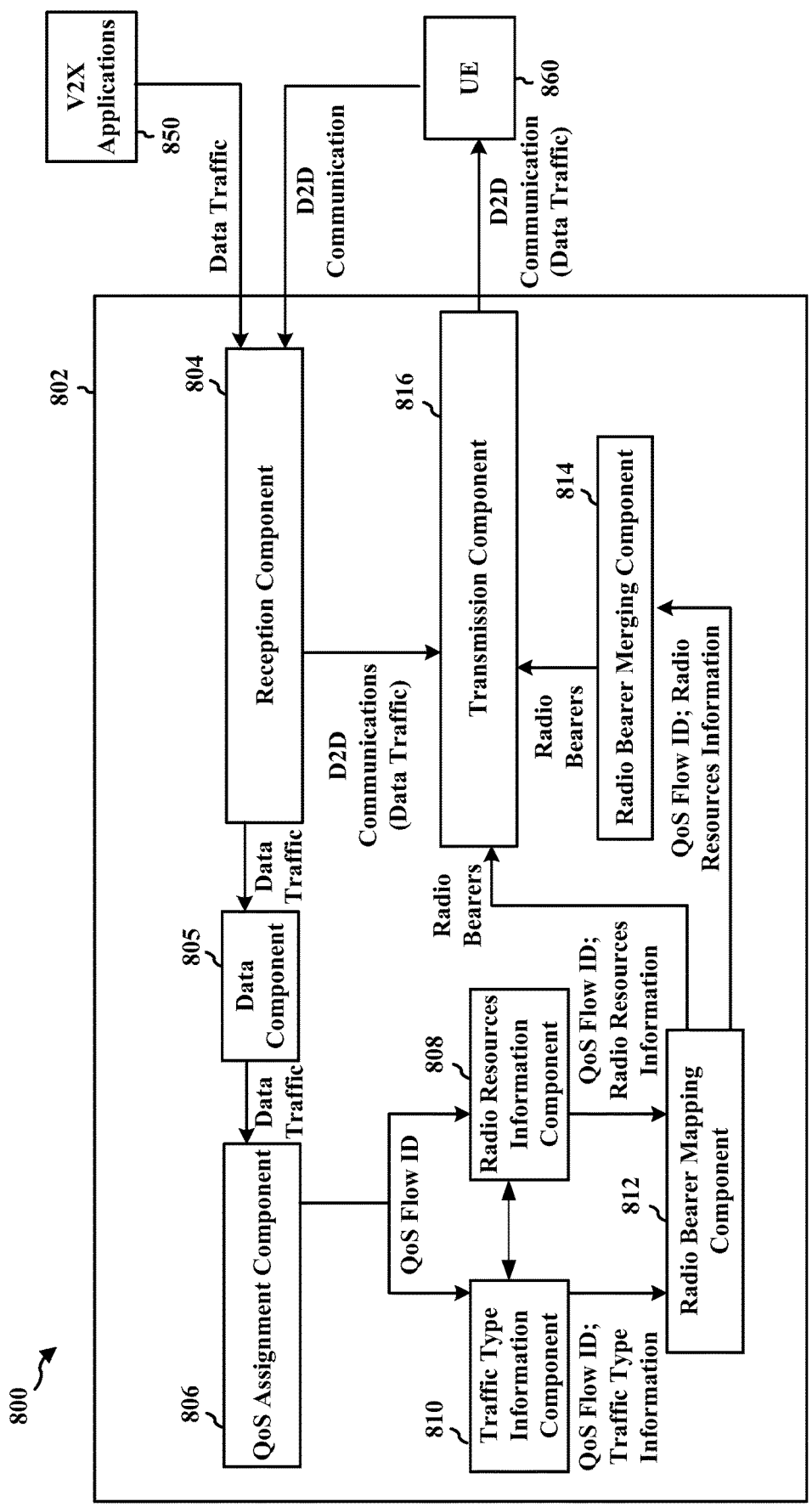
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE or a component of a UE (e.g. the UE 104, 350, 402). The apparatus 802 includes a reception component 804 that receives data traffic from one or more V2X applications 850 and device-to-device (e.g. V2X communications) from one or more other UEs 860. The apparatus 802 includes a data component 805 that receives, via the reception component 804, data traffic from an application layer for transmission in device-to-device communication. The apparatus 802 includes a QoS assignment component 806 that assigns at least one QoS flow ID for the data traffic based on resources information for the data traffic. The apparatus 802 includes a radio resources information component 808 that passes the radio resources information for the data traffic associated with the QoS flow ID to a lower layer, and a traffic type information component 810 that passes the traffic type information for the data traffic to a lower layer. The apparatus 802 includes a radio bearer mapping component 812 that uses the radio resources information sent from the radio resources information component 808 and/or the traffic type information sent from the traffic type information component 810 at the lower layer to determine a mapping of the data traffic associated with the QoS flow ID to at least one radio bearer. The apparatus 802 includes a radio bearer merging component 814 that determines, based on the radio resources information sent from the radio resources information component 808, whether to merge QoS flows having different QoS flow IDs into a same radio bearer at an access stratum layer. The apparatus 802 further includes a transmission component 816 that sends D2D communications and data traffic to the one or more other UEs 860 via the radio bearers mapped by the radio bearer mapping component 812 or merged by the radio bearer merging component 814.

The apparatus 802 may include additional components that perform each of the blocks of the algorithm in the aforementioned flowchart of FIG. 7. As such, each block in the aforementioned flowchart of FIG. 7 may be performed by a component (e.g. 804-816) and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
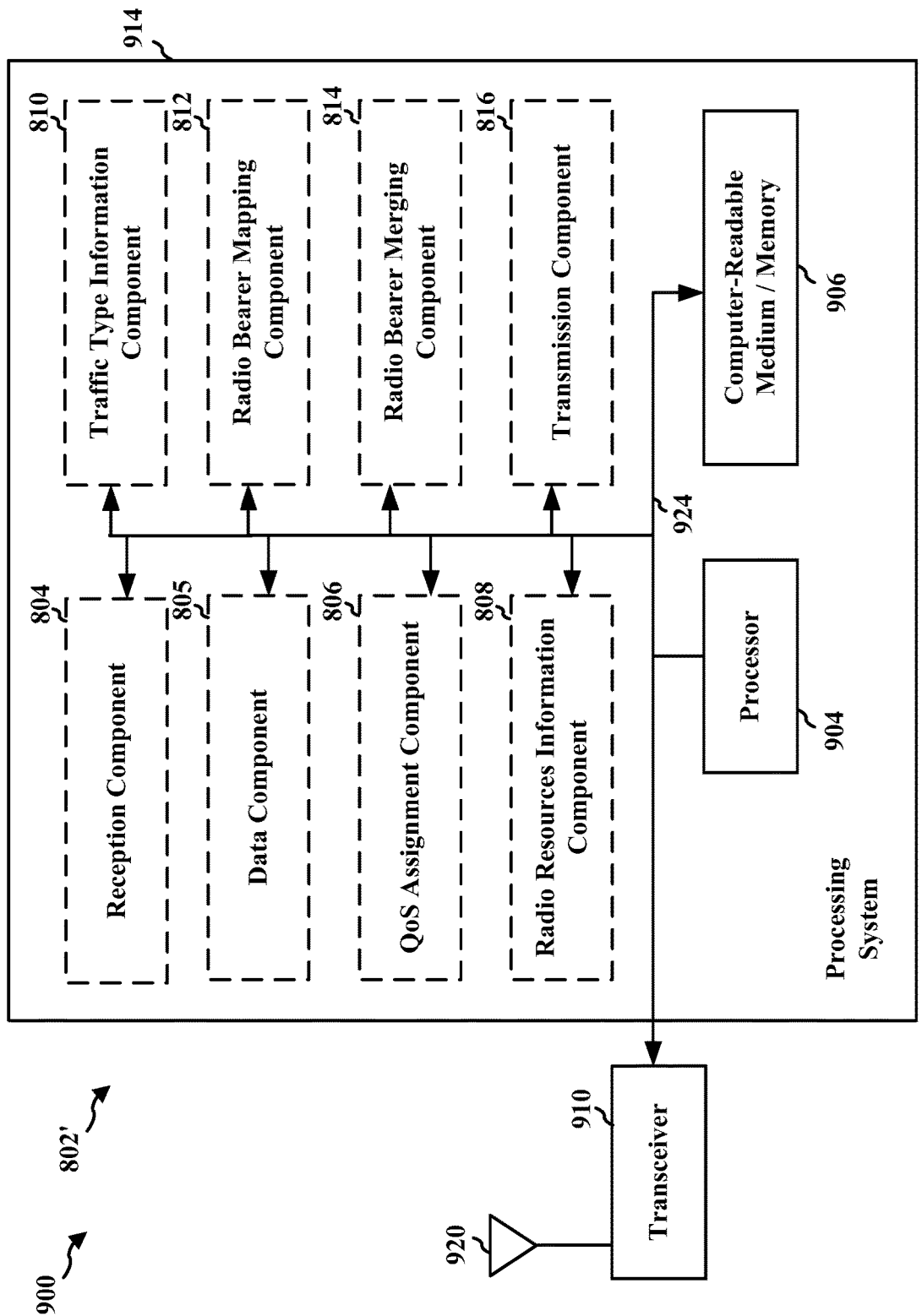
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 805, 806, 808, 810, 812, 814, 816 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 816, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 805, 806, 808, 810, 812, 814, 816. The components may be software components running in the processor 904, resident/stored in the computer readable medium/memory 906, one or more hardware components coupled to the processor 904, or some combination thereof. The processing system 914 may be a component of the device 310 or the device 350 and may include the memory 376, 360 and/or at least one of the TX processor 316, 368, the RX processor 370, 356, and the controller/processor 375, 359. Alternatively, the processing system 914 may be the entire UE (e.g., see device 310 or 350 of FIG. 3).

In one configuration, the apparatus 802/802' for wireless communication includes means for receiving data traffic from an application layer for transmission in device-to-device communication, and means for assigning at least one QoS flow ID for the data traffic based on radio resources information for the data traffic, wherein data packets for transmission with different radio resources are assigned different QoS flow IDs. The apparatus 802/802' may also include means for passing the radio resources information for the data traffic associated with the QoS flow ID to a lower layer, means for determining a mapping of the data traffic associated with the QoS flow ID to at least one radio bearer based on the radio resources information at the lower layer, means for passing the traffic type information for the data traffic to a lower layer, means for mapping the data traffic to at least one radio bearer based on the traffic type information at the lower layer to, and means for determining, based on the radio resources information, whether to merge QoS flows having different QoS flow IDs into a same radio bearer at an access stratum layer.

The aforementioned means may be one or more of the aforementioned components of the apparatus 802 and/or the processing system 914 of the apparatus 802' configured to perform the functions recited by the aforementioned means. As described supra, the processing system 914 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

The following examples are illustrative only and may be combined with aspects of other examples or teachings described herein, without limitation.

Example 1 is a method of wireless communication, comprising: receiving data traffic from an application layer for transmission in device-to-device communication; and assigning at least one Quality of Service (QoS) flow identifier (ID) for the data traffic based on radio resources information for the data traffic, wherein data packets for transmission with different radio resources are assigned different QoS flow IDs.

In Example 2, the method of Example 1 further includes that the radio resources information comprises the frequency band used for the transmission of the data packets.

In Example 3, the method of any of Examples 1-2 further includes passing the radio resources information for the data traffic associated with the QoS flow ID to a lower layer; and determining a mapping of the data traffic associated with the QoS flow ID to at least one radio bearer based on the radio resources information at the lower layer.

In Example 4, the method of any of Examples 1-3 further includes that the device-to-device communication comprises vehicle-to-everything (V2X) communication and the at least one QoS flow ID is assigned at a V2X layer based on the radio resources information for the data traffic.

In Example 5, the method of any of Examples 1-4 further includes that the radio resources information is determined based on a mapping of service type information received from the application layer to the radio resources information.

In Example 6, the method of any of Examples 1-5 further includes that the mapping of service type information to radio resources information is configured at a user equipment (UE).

In Example 7, the method of any of Examples 1-6 further includes that the service type information for the data traffic is indicated from the application layer based on a header for the data traffic.

In Example 8, the method of any of Examples 1-7 further includes that the service type information for the data traffic is indicated from the application layer based on a header extension for the data traffic, wherein the header extension comprises one of a flow label or an Internet Protocol (IP) version 6 (IPv6) extension header.

In Example 9, the method of any of Examples 1-8 further includes that the service type information for the data traffic is indicated from the application layer based on a source identifier.

In Example 10, the method of any of Examples 1-9 further includes that the radio resources information for the data traffic is indicated from the application layer based on a frequency band indication for the data traffic.

In Example 11, the method of any of Examples 1-10 wherein the at least one QoS Flow ID for the data traffic is assigned further based on traffic type information, wherein Internet Protocol (IP) data packets and non-IP data packets are assigned different QoS flow IDs.

In Example 12, the method of any of Examples 1-11 further includes passing the traffic type information for the data traffic to a lower layer; and mapping the data traffic to at least one radio bearer based on the traffic type information at the lower layer.

In Example 13, the method of any of Examples 1-12 further includes that the QoS flow ID is assigned further based on a communication mode for the data traffic such that the data packets are assigned different QoS flow IDs based on the communication mode, the communication mode comprising one of broadcast communication, groupcast communication, and unicast communication.

In Example 14, the method of any of Examples 1-13 further includes that the at least one QoS flow ID is assigned further based on a destination ID for the data traffic such that the data packets with different destination IDs are assigned the different QoS flow IDs.

In Example 15, the method of any of Examples 1-14 further includes that the data traffic is for broadcast communication and the destination ID comprises a broadcast layer 2 (L2) ID.

In Example 16, the method of any of Examples 1-15 further includes that the data traffic is for groupcast communication and the destination ID comprises a group ID or a translated groupcast layer 2 (L2) ID.

In Example 17, the method of any of Examples 1-16 further includes that the data traffic is for unicast communication and the destination ID comprises one of a target user equipment (UE) application layer ID or a link ID.

In Example 18, the method of any of Examples 1-17 further includes that the at least one QoS flow ID is assigned further based on a service type ID for the data traffic such that the data packets with different service type IDs are assigned the different QoS flow IDs.

In Example 19, the method of any of Examples 1-18 further includes that the service type ID comprises a provider service ID (PSID) or an intelligent transportation system application identifier (ITS-AID).

In Example 20, the method of any of Examples 1-19 further includes that the at least one QoS flow ID is assigned based on a one-to-one mapping between the service type ID and the QoS flow ID.

In Example 21, the method of any of Examples 1-20 further includes determining, based on the radio resources information, whether to merge QoS flows having different QoS flow IDs into a same radio bearer at an access stratum layer.

In Example 22, the method of any of Examples 1-21 further includes that the at least one QoS flow ID is assigned further based on one or more QoS requirements from the application layer for the data traffic such that the data packets with different QoS requirements from the application layer are assigned the different QoS flow IDs.

In Example 23, the method of any of Examples 1-22 further includes that the QoS requirements from the application layer comprise at least one of a packet delay budget (PDB) for the data traffic, a packet error rate (PER) for the data traffic, or a range for the data traffic.

Example 24 is a system or apparatus including means for implementing a method or realizing an apparatus as in any of Examples 1-23.

Example 25 is a device including one or more processors and one or more memories in electronic communication with the one or more processors storing instructions executable by the one or more processors to cause the system or apparatus to implement a method as in any of Examples 1-23.

Example 26 is a non-transitory computer readable medium storing instructions executable by one or more processors to cause the one or more processors to implement a method as in any of Examples 1-23.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving data traffic from an application layer for transmission in device-to-device communication; and
   assigning at least one Quality of Service (QoS) flow identifier (ID) for the data traffic based on a frequency resource indicated in radio resources information for the data traffic, wherein data packets for transmission with different frequency resources are assigned different QoS flow IDs.

2. The method of claim 1, wherein the frequency resource comprises a frequency band used for the transmission of the data packets, and the at least one QoS flow ID for the data traffic is assigned based on the frequency band used for the transmission of the data packets.

3. The method of claim 1, further comprising:
   passing the radio resources information for the data traffic associated with the at least one QoS flow ID to a lower layer; and
   determining a mapping of the data traffic associated with the at least one QoS flow ID to at least one radio bearer based on the radio resources information at the lower layer.

4. The method of claim 1, wherein the device-to-device communication comprises vehicle-to-everything (V2X) communication and the at least one QoS flow ID is assigned at a V2X layer based on the radio resources information for the data traffic.

5. The method of claim 1, wherein the radio resources information is determined based on a mapping of service type information received from the application layer to the radio resources information.

6. The method of claim 5, wherein the mapping of the service type information to the radio resources information is configured at a user equipment (UE).

7. The method of claim 6, wherein the service type information for the data traffic is indicated from the application layer based on a header for the data traffic.

8. The method of claim 6, wherein the service type information for the data traffic is indicated from the application layer based on a header extension for the data traffic, wherein the header extension comprises one of a flow label or an Internet Protocol (IP) version 6 (IPv6) extension header.

9. The method of claim 6, wherein the service type information for the data traffic is indicated from the application layer based on a source identifier.

10. The method of claim 6, wherein the radio resources information for the data traffic is indicated from the application layer based on a frequency band indication for the data traffic.

11. The method of claim 1, wherein the at least one QoS flow ID for the data traffic is assigned further based on traffic type information for the data traffic, wherein Internet Protocol (IP) data packets and non-IP data packets are assigned different QoS flow IDs.

12. The method of claim 11, further comprising:
passing the traffic type information for the data traffic to a lower layer; and
mapping the data traffic to at least one radio bearer based on the traffic type information at the lower layer.

13. The method of claim 1, wherein the at least one QoS flow ID is assigned further based on a communication mode for the data traffic such that the data packets are assigned different QoS flow IDs based on the communication mode, the communication mode comprising one of broadcast communication, groupcast communication, and unicast communication.

14. The method of claim 1, wherein the at least one QoS flow ID is assigned further based on a destination ID for the data traffic such that the data packets with different destination IDs are assigned the different QoS flow IDs.

15. The method of claim 14, wherein the data traffic is for broadcast communication and the destination ID comprises a broadcast layer 2 (L2) ID.

16. The method of claim 14, wherein the data traffic is for groupcast communication and the destination ID comprises a group ID or a translated groupcast layer 2 (L2) ID.

17. The method of claim 14, wherein the data traffic is for unicast communication and the destination ID comprises one of a target user equipment (UE) application layer ID or a link ID.

18. The method of claim 1, wherein the at least one QoS flow ID is assigned further based on a service type ID for the data traffic such that the data packets with different service type IDs are assigned the different QoS flow IDs.

19. The method of claim 18, wherein the service type ID comprises a provider service ID (PSID) or an intelligent transportation system application identifier (ITS-AID).

20. The method of claim 18, wherein the at least one QoS flow ID is assigned based on a one-to-one mapping between the service type ID and the at least one QoS flow ID.

21. The method of claim 20, further comprising:
determining, based on the radio resources information, whether to merge QoS flows having different QoS flow IDs into a same radio bearer at an access stratum layer.

22. The method of claim 1, wherein the at least one QoS flow ID is assigned further based on one or more QoS requirements from the application layer for the data traffic such that the data packets with different QoS requirements from the application layer are assigned the different QoS flow IDs.

23. An apparatus for wireless communication, comprising:
means for receiving data traffic from an application layer for transmission in device-to-device communication; and
means for assigning at least one Quality of Service (QoS) flow identifier (ID) for the data traffic based on a frequency resource indicated in radio resources information for the data traffic, wherein data packets for transmission with different frequency resources are assigned different QoS flow IDs.

24. An apparatus for wireless communication, comprising:
a memory; and
at least one processor coupled to the memory and configured to:
receive data traffic from an application layer for transmission in device-to-device communication; and
assign at least one Quality of Service (QoS) flow identifier (ID) for the data traffic based on a frequency resource indicated in radio resources information for the data traffic, wherein data packets for transmission with different frequency resources are assigned different QoS flow IDs.

25. The apparatus of claim 24, wherein the frequency resource comprises a frequency band used for the transmission of the data packets, and the at least one processor is configured to assign the at least one QoS flow ID for the data traffic based on the frequency band used for the transmission of the data packets.

26. The apparatus of claim 24, wherein the at least one processor is further configured to:
pass the radio resources information for the data traffic associated with the at least one QoS flow ID to a lower layer; and
determine a mapping of the data traffic associated with the at least one QoS flow ID to at least one radio bearer based on the radio resources information at the lower layer.

27. The apparatus of claim 24, wherein the at least one processor is configured to assign the QoS Flow ID for the data traffic further based on traffic type information for the data traffic, wherein Internet Protocol (IP) data packets and non-IP data packets are assigned different QoS flow IDs.

28. The apparatus of claim 24, wherein the at least one processor is further configured to:
pass traffic type information for the data traffic to a lower layer; and
map the data traffic to at least one radio bearer based on the traffic type information at the lower layer.

29. The apparatus of claim 24, wherein the at least one QoS flow ID is assigned further based on a service type ID for the data traffic such that the data packets with different service type IDs are assigned the different QoS flow IDs, and wherein the at least one QoS flow ID is assigned based on a one-to-one mapping between the service type ID and the at least one QoS flow ID.

30. A non-transitory computer-readable medium storing computer executable code, the code when executed by a processor cause the processor to:
receive data traffic from an application layer for transmission in device-to-device communication; and
assign at least one Quality of Service (QoS) flow identifier (ID) for the data traffic based on a frequency resource indicated in radio resources information for the data traffic, wherein data packets for transmission with different frequency resources are assigned different QoS flow IDs.

31. The apparatus of claim 24, wherein the device-to-device communication comprises vehicle-to-everything (V2X) communication and the at least one QoS flow ID is assigned at a V2X layer based on the radio resources information for the data traffic.

32. The apparatus of claim 24, wherein the radio resources information is based on a mapping of service type information received from the application layer to the radio resources information.

33. The apparatus of claim 32, wherein the mapping of the service type information to the radio resources information is configured at a user equipment (UE).

34. The apparatus of claim 33, wherein the service type information for the data traffic is indicated from the application layer based on a header for the data traffic.

35. The apparatus of claim 33, wherein the service type information for the data traffic is indicated from the application layer based on a header extension for the data traffic, wherein the header extension comprises one of a flow label or an Internet Protocol (IP) version 6 (IPv6) extension header.

36. The apparatus of claim 33, wherein the service type information for the data traffic is indicated from the application layer based on a source identifier.

37. The apparatus of claim 33, wherein the service type information for the data traffic is indicated from the application layer based on a frequency band indication for the data traffic.

38. The apparatus of claim 24, wherein the at least one processor is configured to assign the at least one QoS flow ID for the data traffic further based on a communication mode for the data traffic such that the data packets are assigned different QoS flow IDs based on the communication mode, the communication mode comprising one of broadcast communication, groupcast communication, and unicast communication.

39. The apparatus of claim 24, wherein the at least one processor is configured to assign the at least one QoS flow ID for the data traffic further based on a destination ID for the data traffic such that the data packets with different destination IDs are assigned the different QoS flow IDs.

40. The apparatus of claim 24, wherein the at least one processor is configured to assign the at least one QoS flow ID for the data traffic further based on one or more QoS requirements from the application layer for the data traffic such that the data packets with different QoS requirements from the application layer are assigned the different QoS flow IDs.

* * * * *